United States Patent
Barchi

(10) Patent No.: US 7,187,932 B1
(45) Date of Patent: Mar. 6, 2007

(54) AUTOPOPULATION OF ADDRESS BOOK ENTRIES

(75) Inventor: Ron Barchi, Maple Valley, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 619 days.

(21) Appl. No.: 10/346,497

(22) Filed: Jan. 16, 2003

(51) Int. Cl.
  *H04Q 7/20* (2006.01)
(52) U.S. Cl. .................. 455/445; 455/405; 455/414.1; 455/425; 379/201.01; 379/213.01; 379/218.01
(58) Field of Classification Search ............. 455/414.1, 455/415, 445, 466, 567, 425, 405; 379/201.01, 379/218.01, 355.04, 356.01, 355.02, 355.09
See application file for complete search history.

(56) References Cited

U.S. PATENT DOCUMENTS

| | | | | |
|---|---|---|---|---|
| 4,734,931 A | * | 3/1988 | Bourg et al. ............. | 379/93.01 |
| 4,800,582 A | * | 1/1989 | D'Agosto et al. ...... | 379/216.01 |
| 5,034,976 A | * | 7/1991 | Sato ........................... | 379/111 |
| 5,204,894 A | * | 4/1993 | Darden ..................... | 379/88.03 |
| 5,483,586 A | * | 1/1996 | Sussman .................. | 379/218.01 |
| 5,689,547 A | * | 11/1997 | Molne ......................... | 379/379 |
| 5,943,611 A | * | 8/1999 | Molne ......................... | 455/564 |
| 6,005,927 A | * | 12/1999 | Rahrer et al. .......... | 379/142.01 |
| 6,163,596 A | * | 12/2000 | Gelfer et al. .............. | 379/67.1 |
| 6,507,866 B1 | | 1/2003 | Barchi | |
| 6,539,238 B1 | * | 3/2003 | Brouns et al. ............... | 455/558 |
| 6,553,222 B1 | * | 4/2003 | Weiss ......................... | 455/415 |
| 6,738,462 B1 | * | 5/2004 | Brunson ................. | 379/142.06 |
| 6,804,338 B1 | * | 10/2004 | Chen ...................... | 379/142.08 |
| 6,870,915 B2 | * | 3/2005 | Stillman et al. ........ | 379/201.01 |
| 2002/0052195 A1 | * | 5/2002 | Lee ............................. | 455/414 |
| 2003/0074372 A1 | | 4/2003 | Barchi et al. | |
| 2003/0110371 A1 | * | 6/2003 | Yang et al. ................. | 713/100 |

OTHER PUBLICATIONS

"vCard: The Electronic Business Card," http://www.imc.org/pdi/vcardwhite.html, 5 pages, visited Nov. 11, 2002.

(Continued)

*Primary Examiner*—Binh K. Tieu
(74) *Attorney, Agent, or Firm*—Klarquist Sparkman, LLP

(57) ABSTRACT

Personal address book data is revised and updated based on communication sources and destination. An address tabulator compares a number of communications directed to a selected destination and based on a subscriber profile, determines if address or contact information associated with the destination is to be added to a personal address book or other contact database. Contact information can be obtained using a reverse phone number lookup in a white pages or yellow pages directory, or using an Internet-based search engine or database. The tabulator can be configured to access the subscriber profile prior to initiating a communication, during a communication, or after completion of the communication. In one example, subscriber billing records are delivered to the tabulator for identification of destinations for which contact information is to be added to the personal address book. Additional or revised contact information can be stored in the personal address book automatically, or in response to a subscriber instruction delivered from a mobile station.

23 Claims, 5 Drawing Sheets

OTHER PUBLICATIONS

"vCard, The Electronic Business Card," Version 2.1, 51 pages, Sep. 18, 1996.

"SyncML Device Information DTD, version 1.1," 38 pages, Feb. 15, 2002.

"Building an Industry-Wide Mobile Data Synchronization Protocol," Version 1.0, 14 pages, 2000.

"SyncML Representation Protocol, Version 1.1," 51 pages, Feb. 15, 2002.

* cited by examiner

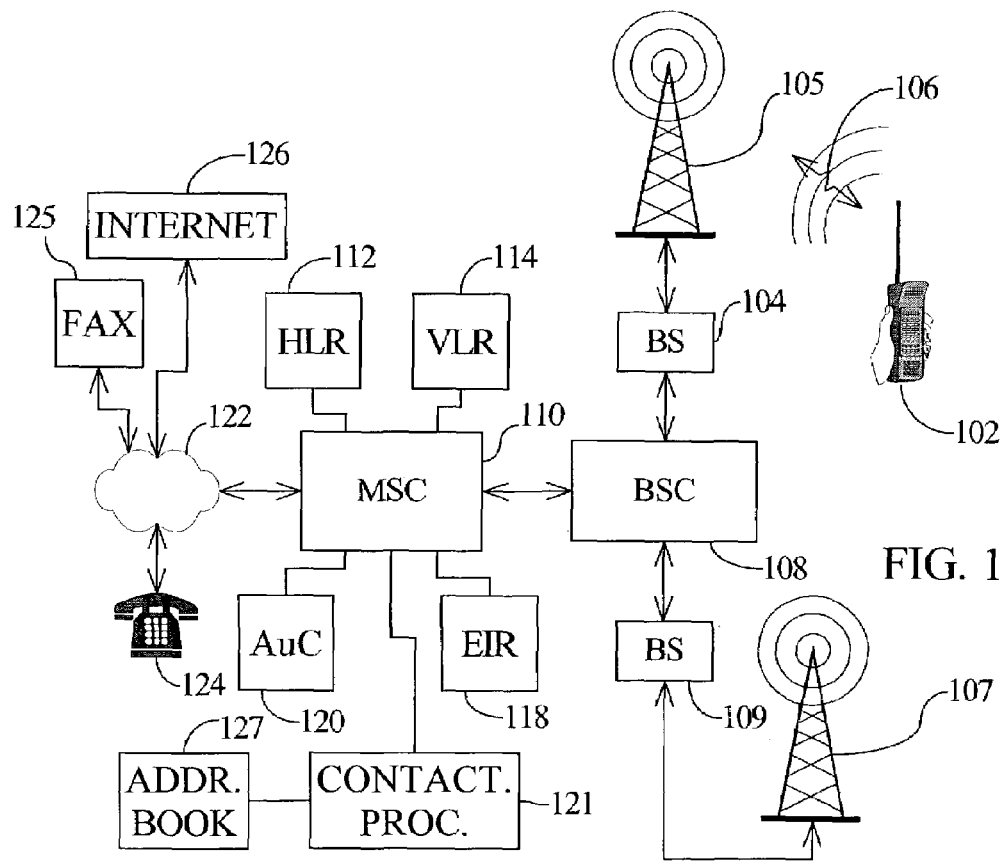
FIG. 1
FIG. 2
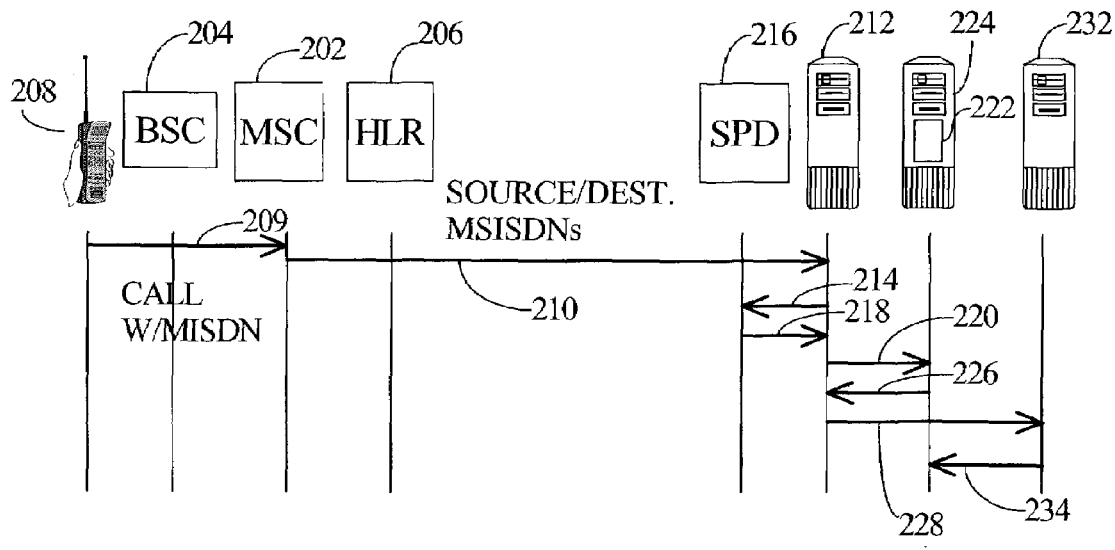

US 7,187,932 B1

AUTOPOPULATION OF ADDRESS BOOK ENTRIES

FIELD OF THE INVENTION

The disclosure pertains to methods of revising and populating address book entries.

BACKGROUND

The development of cellular communication networks permits network subscribers to make and receive calls, send and receive email messages and short message service messages, send and receive faxes, and perform other communication tasks while at a fixed location or while mobile. Thus, a subscriber need not remain at a particular home or business address in order to remain accessible for personal or business communications. For example, a network subscriber can configure a mobile office so that the subscriber can send and receive typical business and personal communications, even while mobile. For example, a realtor can configure an automobile with a fax machine, a laptop computer, a personal digital assistant or handheld computer, and a cellular telephone or other mobile station. As a result, the realtor need not return to an office regularly, increasing her availability for client contact. Other subscribers can take advantage of mobile communications to remain in touch with friends and family, even while traveling.

While mobile communication systems offer numerous advantages, management of necessary contact information can be difficult. Access to a stored customer/contact database is typically unavailable, so that obtaining contact data such as phone numbers and addresses is difficult. Methods and apparatus are needed that permit network subscriber to access and revise contact data while mobile.

SUMMARY OF THE INVENTION

Methods of populating a contact database comprise receiving a contact identifier associated with a communication with a contact. The contact identifier is analyzed and contact information associated with the contact identifier is selected for inclusion in the contact database based on the analysis. In additional examples, methods further comprise recording a tally count associated with the contact identifier, and analyzing the contact identifier based on the recorded tally count. In other examples, a contact data search associated with the contact identifier is performed to obtain contact data records and the contact database is populated using the contact data records. In additional representative examples, the contact analysis is based on a predetermined set of contact identifiers for which contact data is excluded from the contact database. In further examples, the contact database is populated with the selected information if contact data associated with the contact identifier is not included in the contact database. In other examples, an aging parameter is associated with contact data included in the contact database, and the contact database is updated with the selected information based on the aging parameter. In representative examples, the contact identifier is a mobile station ISDN number, a phone number, and/or an email address.

Methods of selecting data for a contact database include selecting a destination and initiating a communication to the selected destination. At least one usage indicator associated with the destination is analyzed and, based on the analysis, contact data associated with the identifier is selected for inclusion in a contact database. In additional examples, contact data associated with the identifier is gathered and included in the contact database based on the analysis. In other examples, the at least one usage indicator includes a tally count of a number of communications associated with the selected destination. In specific examples, the usage indicator is associated with a number of communications of a selected types directed to the selected destination.

Communication networks comprise a usage analyzer configured to receive usage indicators including a destination associated with a communication initiated by a network subscriber and to select destinations based on the usage indicators. A contact data acquisition unit is in communication with the usage analyzer and is configured to obtain contact data for destinations selected by the usage analyzer. In other examples, a subscriber profile database is configured to deliver subscriber profile parameters to the usage analyzer, wherein the usage analyzer selects destinations based on the subscriber profile parameters. In representative examples, the subscriber profile parameters include a tally count associated with a number of communications directed to a destination. In additional examples, a memory is configured to store personal address book data and the usage indicator is configured to receive billing records and select destinations based on the billing records.

Mobile stations comprise a user profile input configured to select at least one subscriber profile parameter associated with an address book and a transceiver configured to communicate the at least one address book update parameter to subscriber usage analyzer. In additional examples, the at least one address book update parameter is a destination tally parameter, and a memory is configured to store at least one address book update parameter. In other examples, the transceiver is configured to receive address book entries and store the address book entries a memory. In additional representative examples, the user profile input is configured to acknowledge population of an address book.

These and other examples are described below with reference to the accompanying drawings.

BRIEF DESCRIPTION OF THE DRAWINGS

FIG. 1 is a schematic diagram of a communication system that includes a contact processor and an address book.

FIG. 2 is a schematic diagram of a communication system illustrating a method of updating a personal address book.

DETAILED DESCRIPTION

Figure 3:
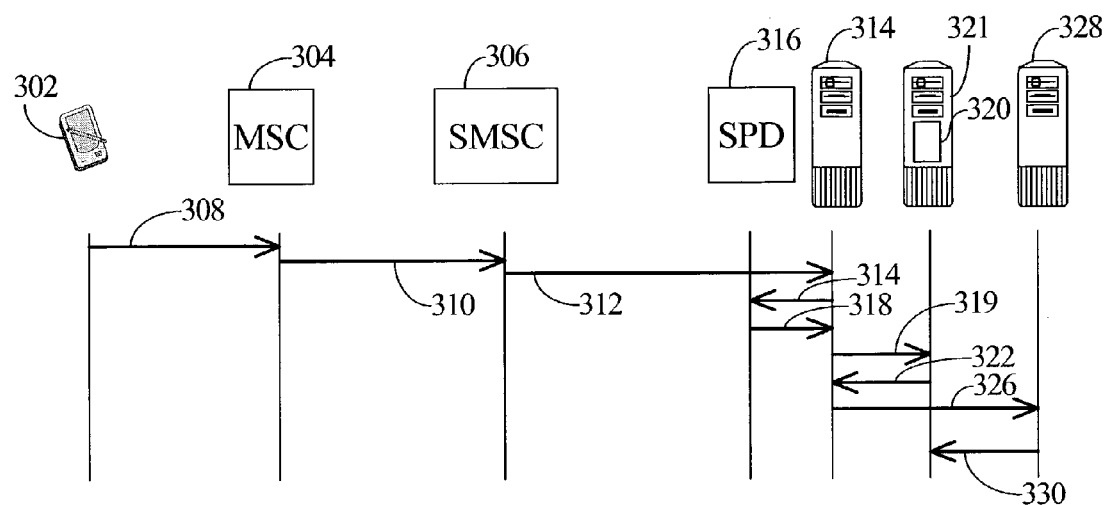
FIG. 3 is a schematic diagram of a communication system illustrating a method of updating a personal address book based on communication of a short message service (SMS) message.

Methods and apparatus for revising, expanding, and updating contact information are described with reference to contact information stored in one or more address books. Address books can be configured to store a variety of user information such as contact names, phone numbers (including home, business, and cell phone numbers), fax numbers, email addresses, home and business addresses, web pages, and other personal or business information.

With reference to FIG. 1, a communication system includes a mobile station 102 that communicates with a mobile base station 104 and an antenna 105 over an air interface 106. The mobile base station 104 is in communication with a base station controller (BSC) 108 and a mobile switching center (MSC) 110. The BSC 108 is configured to communicate with additional base stations and antennas such as a mobile base station 109 and an antenna 107. A home location register (HLR) 112, a visitor location register (VLR) 114, and a contact processor 121 are in communication with the MSC 110. The HLR 112 provides storage for subscriber information such as subscriber MSISDNs and other permanent and temporary information associated with subscribers. The VLR 114 provides data storage for mobile stations that are in a service area associated with the MSC 110, but that are not associated with subscribers to the network serviced by the MSC 110. An equipment identity register (EIR) 118 and an authentication center (AuC) 120 are also in communication with the MSC 110. The MSC 110 is in communication with a public switched telephone network (PSTN) 122 that is in communication with one or more telephones such as a representative telephone 124 and other communication devices such as a fax machine 125. The MSC 110 can be configured to communicate directly with other remote or local networks or the Internet. Alternatively, communication with additional networks can be provided via the PSTN 122. The mobile base station 104 is shown in FIG. 1 as communicating with the mobile station 102, but typically the mobile base station 104 is configured to communicate with one or more mobile stations such as cell phones, laptop computers, personal digital assistants, handheld computers, or other communication devices. In addition, the mobile station 102 can communicate with mobile stations associated with wireless networks that are in communication with the PSTN 122 or the MSC 110. The PSTN 122 is generally configured for communication with landline telephones such as the telephone 124 or other fixed devices such as the fax machine 125, desktop computers, servers, or other devices. In addition, the PSTN 122 permits communication with one or more additional networks such as a representative network 126, shown in FIG. 1 as the Internet.

The contact processor 121 is configured to receive origination information, destination information, and/or message characterization information pertaining to a communication. For example, for a voice call from the mobile station 102 to another mobile station, the contact processor 121 can receive one or more identifiers such as originating and destination phone numbers or originating and destination equipment identifiers. The contact processor 121 can also receive a message indicator that identifies the message as a voice message. In other examples, a message indicator can identify the message as a short message service message, a fax, an email, video, audio, or other message type. The contact processor 121 can also be situated at other locations in a communication network in association with the PSTN 122, the BSC 108, or at a mobile station 102. A contact database or address book 127 can be configured to receive identifiers from the contact processor 121 and can co-located with the contact processor 121, or the address book 127 and the contact processor 121 can be situated at different network locations. Location of the address book 127 in a wireless network facilitates access for mobile subscribers.

With reference to FIG. 2, a wireless communication network includes a mobile switching center (MSC) 202 that is in communication with a base station controller (BSC) 204, a home location register (HLR) 206 and a mobile station (MS) 208. The MS 208 originates a message 209 that is delivered to the MSC 202. The MSC 202 is configured to deliver a message 210 to an address tabulator 212 as well as delivering a message to a message destination. The message 210 can include mobile station integrated services digital network numbers (MSISDNs) associated with a call source such as the MS 208 or a call destination. The message 210 can include different or additional identifiers associated with a source or destination of a voice call, an email, a fax, or other communication.

The address tabulator 212 directs a subscriber profile request 214 to a subscriber profile directory (SPD) 216 that is configured to store subscriber profile parameters for one or more network subscribers. The subscriber profile request 214 typically includes a subscriber identity such as an originating MSISDN. The SPD 216 returns one or more selected subscriber profile parameters to the address tabulator 212 in a profile return message 218. Based on the received profile parameters, the address tabulator 212 issues a destination lookup request 220 to a personal address book (PAB) 222 stored at a server 224. The server 224 returns a notification 226 that indicates if the destination MSISDN is included in the PAB 222, and in the example of FIG. 2, the notification indicates that the MSISDN is not stored in the PAB 222. The address tabulator 212 then issues a lookup request 228 to lookup system 232 that returns a destination data message 234 that includes, for example, one or more addresses, user names, and other information associated with the destination MSISDN. The information stored in the PAB 222 is then updated based on the returned destination data message 234.

The SPD 216 can return one or more subscriber profile parameters to the address tabulator 212 in the profile return message 218, based on an SPD subscriber configuration that can be setup based on default values, or customized by or for an individual subscriber, or a subscriber group. In addition, the SPD 216 can be configured so that only selected network subscribers are eligible to use the SPD 216. Eligibility can be determined by, for example, a user's subscription type or other subscriber or network configurations. Processing associated with the PAB 222 can be performed prior to call completion, after call completion, or after call termination, or a combination thereof. Updates to the PAB 222 can be entered in the PAB 222 automatically or a request for user approval of changes to the PAB 222 can be issued based on, for example, subscriber profile parameters stored in the SPD 216.

Subscriber profile parameters can be associated with a number of calls or other communications to a destination associated with a single MSISDN. For example, a threshold tally count for a single destination can be set so that once this number of calls to the destination is reached, destination address information is added to the PAB 222. The tally count can be associated with a tally frequency so that the tally count threshold can be reached based on a number of contacts to a destination within a selected time period. In other examples, the PAB 222 can be updated based on, for example, time of call requests, or particular call destinations. For example, address or other information for destinations associated with a specified country code, area code, or local exchange code can be selected for inclusion or addition to the PAB 222. As a specific example, calls to phone numbers having a particular prefix associated with, for example, a selected business or other institution, can be identified so that contact and address information for such numbers can be added to the PAB 222 after only one call request, or after a selected number of call requests that is less than a tally frequency threshold associated with other communication requests.

The SPD 216 can be updated based on address, contact, or other information provided by the lookup system 232 that can be based on a reverse white pages/yellow pages lookup, obtained by a database query, obtained by one or more Internet-based searches or other search engines. Additional databases can also be selected. For example, industry specific databases can be queried, and maps, photographs, drawings, other information can be retrieved and stored for one or more communication destinations.

With reference to FIG. 3, a communication system includes a portable digital assistant 302 or other mobile device configured to communicate with a wireless communication system that includes a mobile switching center 304 and short message service center (SMSC) 306. A subscriber directs a message 308 from the PDA 302 to the MSC 304, and the MSC 304 directs a request 310 to the SMSC 306 to deliver a short message service (SMS) message to a destination. In addition, the SMSC 306 transmits a message 312 that includes address or contact data based on billing information associated with PDA 302, or the subscriber, or both to a number/address tabulator 314 at a server or other computer or processor. The tabulator 314 issues a request for subscriber profile information to a subscriber profile database (SPD) 316 that responds by directing a profile message 318 to the tabulator 314. Based on subscriber profile parameters and the billing information, address or contact data is selected for addition to, for example, a master personal address book (PAB) 320. The tabulator 314 directs a request 319 to the server 321 to determine if the PAB 320 already contains contact information corresponding to the data selected for addition, and the server 321 returns a message 322 that acknowledges if such data is stored. If such data is already stored, the stored data can be updated based on a subscriber parameter such as a refresh time. If the server 321 confirms that data corresponding to the selected data is not stored or stored data is to be updated, then the tabulator 314 sends a lookup request 326 to a server 328 that gathers contact data based on telephone or email directories, other directories, from the Internet, or otherwise collected. The contact data is communicated to the PAB 320 in a message 330, and the PAB 320 is updated.

Figure 4:
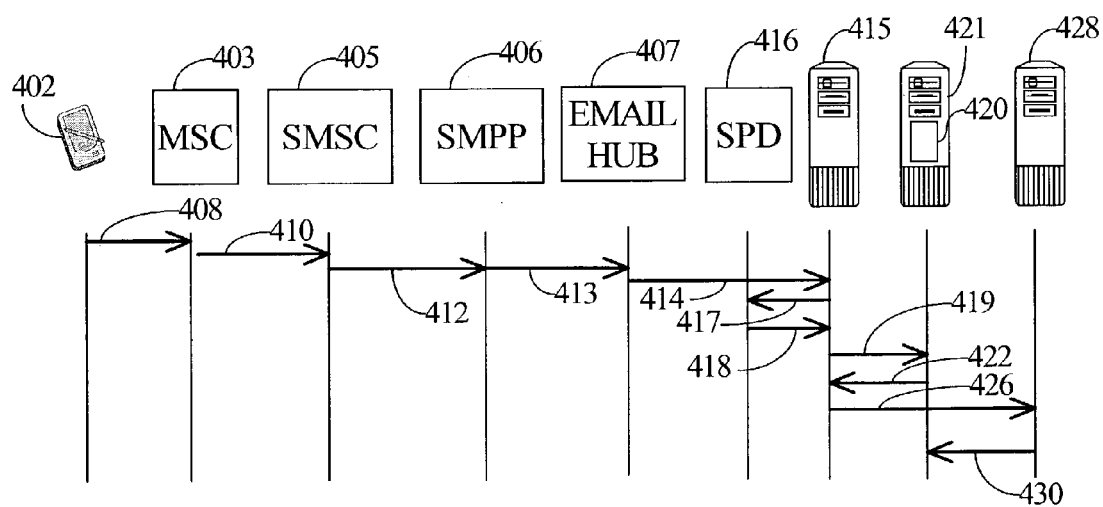
FIG. 4 is a schematic diagram of a communication system illustrating a method of updating a personal address book based on communication of an email.

With reference to FIG. 4, a communication system includes a personal digital assistant 402 configured to communicate with a mobile switching center (MSC) 403 of a wireless communication network. The MSC 403 is in communication with a short message service center (SMSC) 405 and a short message peer-to-peer protocol processor (SMPP) 406. The SMPP 406 can be configured as a dedicated processor or included at the SMSC 405 or other network location to permit communication of voice mail and email between different networks, particularly between wired networks and wireless networks. The SMPP 406 directs a message 413 to an email hub 407 that in turn directs a message 414 to an address analyzer 415. Based on the message 414, the address analyzer 415 issues a request 417 to a subscriber profile database (SPD) 416 for parameters associated with address or contact updates. The SPD 416 returns a message 418 and based on the message 418, directs a request 419 to a server 421 associated with a contact database 420. Depending on a message 422 returned by the server 421, a request 426 is delivered to a lookup server 428 to gather contact information associated with a message destination. A return message 430 containing contact information is delivered to the server 421 and the contact database 420 is updated.

Figure 5:
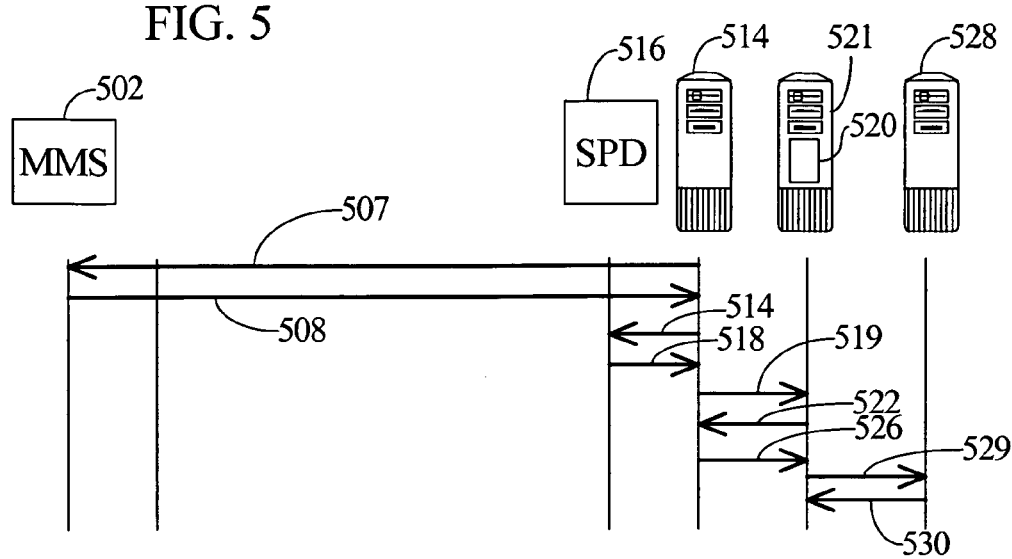
FIG. 5 is a block diagram illustrating a method of adding or updating contact information to an address book or other database.

With reference to FIG. 5, a contact tabulator 514 directs a request 507 to an MMS 502 so that a communications summary 508 is returned to the contact tabulator 514. The communications summary 508 can be based on information concerning communication origination, destination, content, or other information based on, for example, subscriber billing records. The contact tabulator 514 and a subscriber profile database (SPD) 516 exchange messages 514, 518, and based on the SPD 516, the contact tabulator 514 requests data from a contact database 520 and receives requested data from the contact database 520 in messages 519, 522, respectively. The contact tabulator 514 issues a request 526 for contact data, and the server 521 issues a request 529 for additional contact data to lookup server 528 that returns contact data in a message 530.

Figure 6:
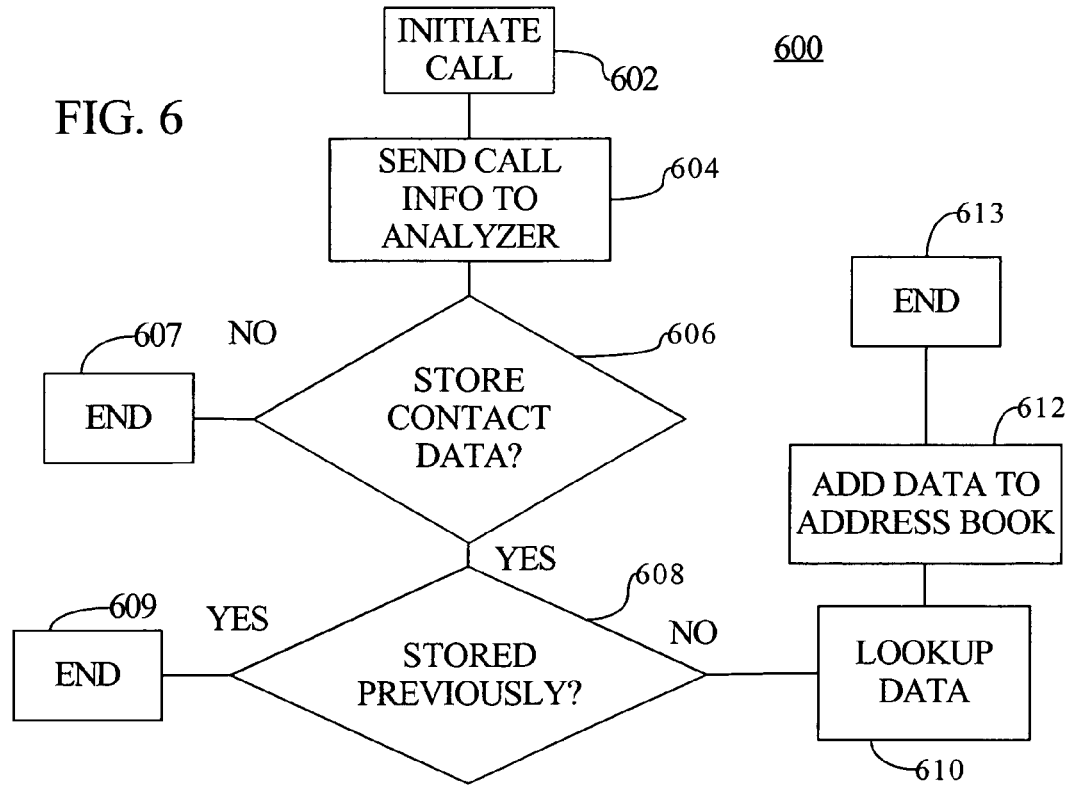
FIG. 6 is a block diagram illustrating a method of adding or updating contact information to an address book or other database.

With reference to FIG. 6, a method of populating an address book or other database includes a step 602 of initiating a communication such as a voice call, email, fax, or other communication to a selected destination. Information concerning the communication such as communication type, source, and destination are directed to a contact analyzer in step 604 and in a step 606 communication-based information such as destination and type are analyzed to determine if contact information associated with the communication or communication destination is to be stored. If contact information is not to be stored, the method ends in a step 607. Such a determination can be based on, for example, a comparison of a number of communications directed to the destination with respect to a threshold number stored in a subscriber profile. Using such an approach, destinations that are frequently used can be identified for addition to the address book. In some cases, destination information is not stored. For example, destinations such as phone numbers, can be included in a "do not add" list, so that associated information is not retrieved. An "anti-spamming detector" can also be provided so that such contacts are excluded. Contact information that is already included can be identified in a step 608, so that such information is not retrieved again, and the procedure ends in a step 609. Alternatively, such information can be updated based on a subscriber profile parameter associated with contact aging, wherein contact data older than a predetermined time is selectively updated. Contact information is obtained in a step 610 using directories, the Internet, or other date sources, and the contact information is added to the address book in a step 612, and the method ends in a step 613.

Figure 7:
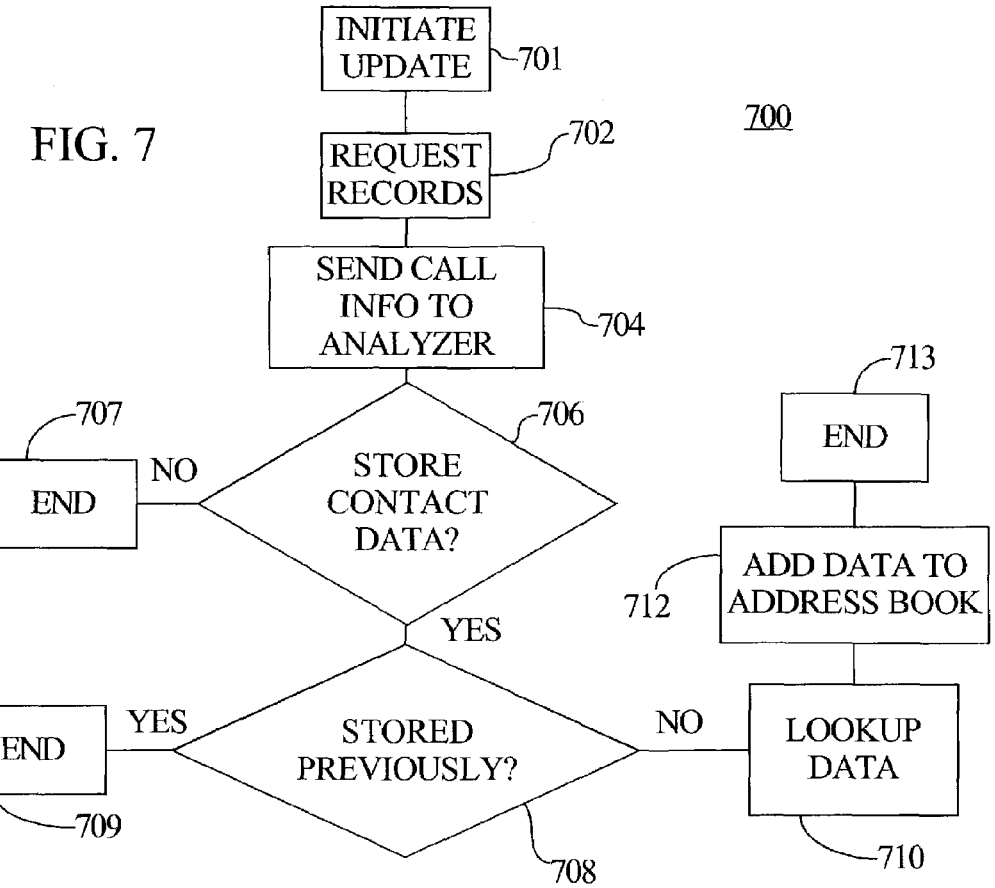
FIG. 7 is a block diagram illustrating a method of adding or updating contact information to an address book or other database.

With reference to FIG. 7, another representative method of populating or updating a contact database includes initiating an update request in a step 701. In a step 702, communication records such as billing records for a subscriber are obtained and delivered to a contact analyzer. In step 704, the contact analyzer identifies contact data such as phone numbers, email addresses, or other destinations, groups of destinations, or message types or formats associated with particular destinations or groups of destinations. In a step 706, data storage is selected based on, for example, subscriber parameters stored in a subscriber profile database. If storage is not selected, the method ends in a step 707. In a step 708, selected data is screened to avoid overwriting of existing contact data and to eliminate contact data associated with "do not call" or "do not email" destinations. If no data storage or data updates are selected, the method ends in a step 709. In a step 710, contact data is retrieved, and in a step 712, contact data in an address book or other storage is updated. The method ends in a step 713.

Figure 8:
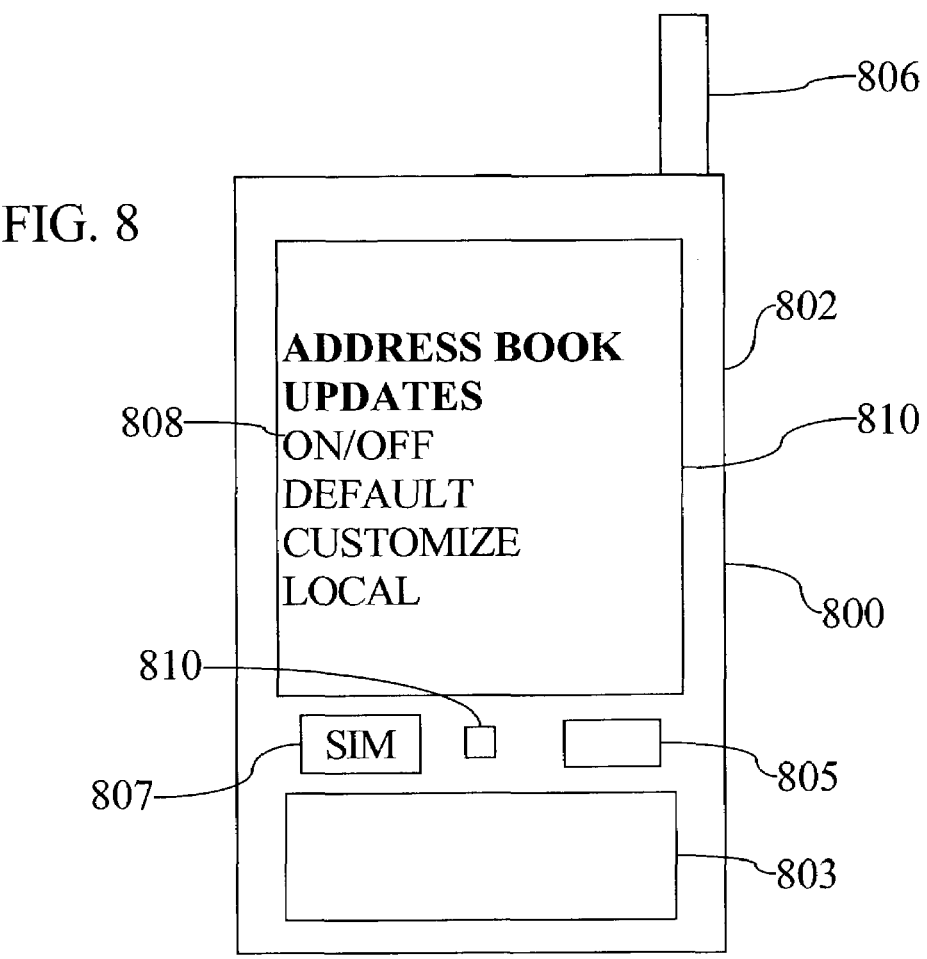
FIG. 8 is a schematic diagram of a mobile station configured to communicate with a network-based address book.

With reference to FIG. 8, a personal digital assistant (PDA) 802 or other mobile device is configured to communicate with other mobile or fixed locations using a network-based or other contact database or address book. The PDA 802 includes a transceiver 805 and an antenna 806 configured to communicate with a wireless network. A subscriber identity module (SIM) 807 includes a processor and memory configured to store one or more subscriber identifiers such as, for example, an international mobile subscriber identity (IMSI) and/or an MSIDSN. The PDA 802 is configured to display an address book control menu 808 on a PDA display 810. The menu 808 can include a display of menu items associated with, for example, autopopulation of contact information, manually controlled population of a contact database, entry and editing of subscriber profile parameters associated with additions to and revisions of the contact database, and disabling address book population. A menu entry can also be associated with synchronizing a local copy of a personal address book with an address book stored on a network. A subscriber profile database can be stored in memory 810 at the PDA 802 and synchronized with a network copy so that address book entries can be updated without access to a particular network. Menu items are conveniently selecting using a user input 803 such as one or more programmable or dedicated keys, a keypad, or a stylus that can be positioned at a selection region associated with a menu item to be selected.

In some examples, an MSISDN serves as a communication source or destination identifier. Other identifiers can be used such as, for example, an international mobile subscriber identity (IMSI), an international mobile equipment identity (IMEI), email addresses, domain names, web addresses, PSTN telephone numbers, or other communication source or destination identifiers. In additional examples, contact data gathering can be executed and gathered data stored based on, for example, a common message recipient for emails, faxes, and other communications. A tally count can be based on communications to a recipient, even if the recipient is associated with several subscriber identifiers.

Figure 9:
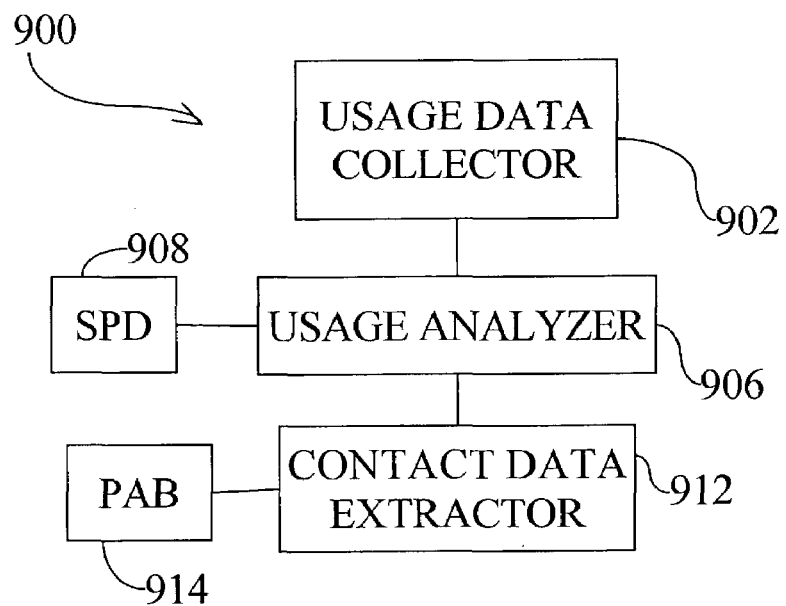
FIG. 9 is a schematic block diagram of a contact processing system.

For mobile users, the PAB and associated processing can be conveniently located in a wireless network so that the PAB is accessible. In other examples, PAB storage and PAB processing can be includes at a mobile station such as a cell phone or a personal digital assistant. A representative contact processing system 900 is illustrated in FIG. 9. A usage data collector 902 receives communication identifiers associated with one or more communications, and delivers identification information to a usage analyzer 906. Based on a subscriber profile configuration (SPD) stored in a memory 908, the analyzer issues a request for additional address book data to an address book data collector 912 that performs database searches or other searches, or requests performance of such searches. Collected data can be screened or verified, and accepted address book data is stored in an address book memory 914. Components of the system 900 can be situated at one or more network locations.

Figure 10:
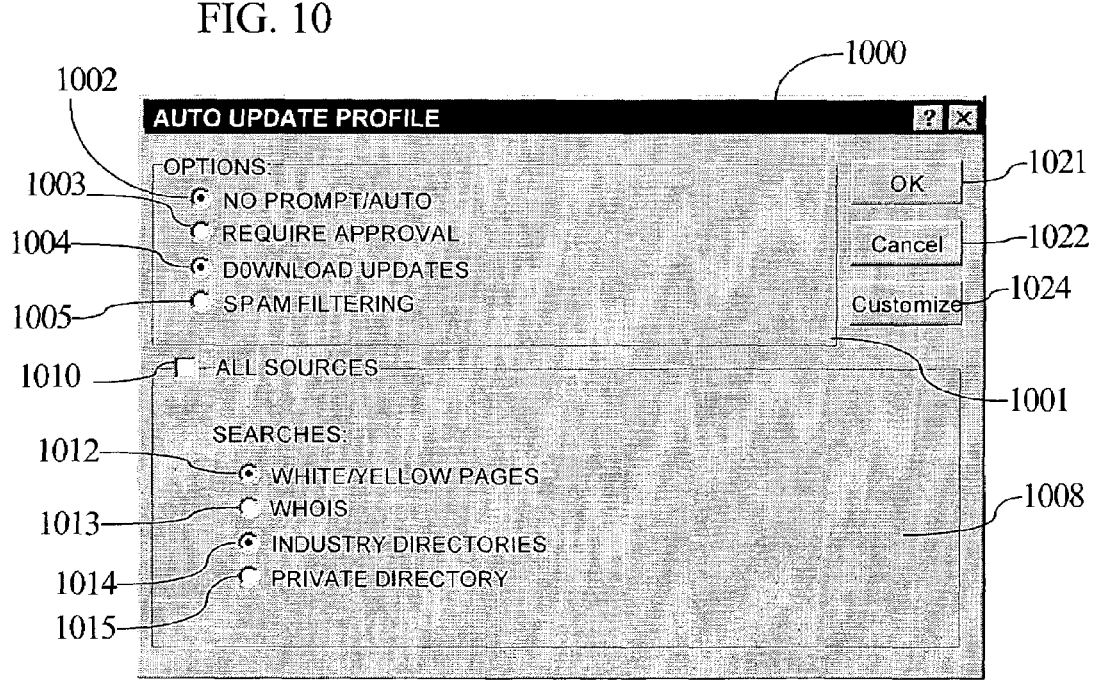
FIG. 10 is a schematic diagram of a menu associated with a user interface for configuring a subscriber profile database associated with an address book.

A subscriber profile can be updated based on a menu that is used to select subscriber profile parameter fields for selecting a tally count, message types to be tallied, and other parameters. With reference to FIG. 10, a representative menu 1000 is configured for entry of subscriber profile parameters and control of selections associated with the update and population of a contact database. The menu 1000 includes an options area 1001 that displays menu entries 1002, 1003, 1004, 1005 that are associated with address book autopopulation, user approval of address book updates, downloading of an address book to, for example, a mobile station, and spam filtering respectively. Sources from which address book data is collected are selected using a source area 1008. A menu entry 1010 is associated with searching a complete set of address book sources. Alternatively, data sources can be individually selected using menu entries 1012, 1013, 1014, 1015. The menu 1000 can be displayed on, for example, a PDA, cell phone, a laptop computer, or other device, and menu entries can be selected using a keypad, keyboard, a mouse, a stylus, or other pointing device or input device. Menu entries can be accepted or rejected using menu areas 1020, 1022, respectively, and configuration of additional parameters is performed based on customization associated with a menu area 1024.

The particular examples described above are illustrative of address book autopopulation and other methods and apparatus associated with providing data to an address book or revising or updating address book data. It will be apparent that these examples can be modified in arrangement and detail, and I claim all that is encompassed by the appended claims.

I claim:

1. A method of populating a contact database, comprising:
receiving a contact identifier from billing records associated with a communication with a contact, wherein the contact identifier comprises a destination phone number;
analyzing the contact identifier and billing records;
selecting contact information based on the billing records and associated with the contact identifier for inclusion in the contact database based on the analysis, wherein the contact information comprises a name, and wherein the selecting comprises finding a name associated with the destination phone number; and
storing at least the name associated with the destination phone number in the contact database based on the selection.

2. The method of claim 1, further comprising, recording a tally count associated with the contact identifier, and analyzing the contact identifier based on the recorded tally count.

3. The method of claim 2, further comprising:
performing a contact data search associated with the contact identifier to obtain contact data records; and
populating the contact database using the contact data records.

4. The method of claim 1, further comprising:
performing a contact data search associated with the contact identifier to obtain contact data records; and
populating the contact database using the contact data records.

5. The method of claim 1, wherein the contact analysis is based on a predetermined set of contact identifiers for which contact data is not to be added to the contact database.

6. The method of claim 1, further comprising determining if contact data associated with the contact identifier is included in the contact database.

7. The method of claim 6, further comprising populating the contact database with the selected information if contact data associated with the contact identifier is not included in the contact database.

8. The method of claim 6, further comprising determining an aging parameter associated with contact data previously included in the contact database, and updating the contact database with the selected information based on the aging parameter.

9. The method of claim 1, wherein the contact identifier further comprises a mobile station ISDN number or an email address.

10. A method of selecting data for a contact database, comprising:
 selecting a destination, wherein the destination comprises a phone number;
 initiating a communication to the selected destination;
 receiving billing records associated with the communication;
 analyzing the billing records and at least one usage indicator associated with the destination;
 based on the analysis, selecting contact data associated with the destination for inclusion in a contact database, wherein the contact data comprises a name; and
 based on the selected contact data, storing at least the name associated with the phone number in the contact database.

11. The method of claim 10, further comprising gathering contact data associated with the destination, and including the gathered data based on the analysis.

12. The method of claim 11, wherein the at least one usage indicator includes a tally count of a number of communications associated with the selected destination.

13. The method of claim 10, wherein the usage indicator is associated with a number of communications directed to the selected destination.

14. A communication network, comprising:
 a usage analyzer configured to receive usage indicators associated with communications initiated by a network subscriber and to select at least one destination based on the usage indicators, wherein the usage analyzer is configured to receive billing records and select destinations based on the billing records, and wherein each of the at least one destinations comprises a phone number;
 a contact data acquisition unit in communication with the usage analyzer and configured to obtain contact data for at least one destination selected by the usage analyzer, wherein the contact data comprises a name; and
 a storage unit in communication with the contact data acquisition unit configured to store the name associated with the at least one destination phone number.

15. The communications network of claim 14, further comprising a subscriber profile database configured to deliver subscriber profile parameters to the usage analyzer, wherein the usage analyzer selects at least one destination based on the subscriber profile parameters.

16. The communications network of claim 15, wherein the subscriber profile parameters include a tally count associated with a number of communications directed to a destination.

17. The communications network of claim 15, further comprising a memory configured to store personal address book data.

18. A communication network, comprising:
 a usage analyzer configured to receive usage indicators associated with communications initiated by a network subscriber and to select at least one destination based on the usage indicators, wherein the usage analyzer is configured to receive billing records and select destinations based on the billing records;
 a contact data acquisition unit in communication with the usage analyzer and configured to obtain contact data for at least one destination selected by the usage analyzer; and
 a subscriber profile database configured to deliver subscriber profile parameters to the usage analyzer, wherein the usage analyzer selects at least one destination based on the subscriber profile parameters.

19. A mobile station, comprising:
 a user profile input configured to select at least one subscriber profile parameter associated with an address book, wherein the user profile input comprises an address book control menu; and
 a transceiver configured to communicate the at least one address book update parameter to a subscriber usage analyzer, and to synchronize a local copy of the address book with a network copy of the address book, wherein the subscriber usage analyzer is configured to receive billing records and select destinations based on the address book update parameter and the billing records.

20. The mobile station of claim 19, wherein the at least one address book update parameter is a destination tally parameter.

21. The mobile station of claim 19, further comprising a memory configured to store at least one address book update parameter.

22. The mobile station of claim 19, further comprising a memory, wherein the transceiver is configured to receive address book entries and store the address book entries in the memory.

23. The mobile station of claim 19, wherein the user profile input is configured to acknowledge population of an address book.

* * * * *